United States Patent
Quinn et al.

(10) Patent No.: US 11,822,792 B2
(45) Date of Patent: Nov. 21, 2023

(54) TRANSFORMING APPLICATION-INSTANCE SPECIFIC DATA

(71) Applicant: EMC IP Holding Company LLC, Hopkinton, MA (US)

(72) Inventors: Brett A. Quinn, Lincoln, RI (US); Douglas E. LeCrone, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/083,793

(22) Filed: Oct. 29, 2020

(65) Prior Publication Data

US 2022/0137828 A1    May 5, 2022

(51) Int. Cl.
*G06F 3/06* (2006.01)

(52) U.S. Cl.
CPC ............ *G06F 3/0619* (2013.01); *G06F 3/067* (2013.01); *G06F 3/0653* (2013.01); *G06F 3/0659* (2013.01)

(58) Field of Classification Search
CPC .... G06F 3/0619; G06F 3/0653; G06F 3/0659; G06F 3/067
See application file for complete search history.

(56) References Cited

U.S. PATENT DOCUMENTS

| | | | |
|---|---|---|---|
| 2004/0070607 A1* | 4/2004 | Yalovsky | G06F 40/151 715/746 |
| 2005/0114365 A1* | 5/2005 | Tucker | G06F 16/2379 |
| 2009/0055606 A1* | 2/2009 | Gallaher | G06F 11/1448 711/E12.103 |
| 2011/0208789 A1* | 8/2011 | Amit | G06F 3/0611 707/810 |
| 2015/0326664 A1* | 11/2015 | Richter | H04L 67/1095 709/217 |

* cited by examiner

*Primary Examiner* — Arpan P. Savla
*Assistant Examiner* — Eric T Loonan
(74) *Attorney, Agent, or Firm* — Muirhead and Saturnelli, LLC

(57) ABSTRACT

Transforming data that is provided by a first instance of an application that uses application-instance specific data includes determining if a component of the data is an application-instance specific component and, if the component is an application-instance specific component, transforming the component either at a storage system containing the data or as the component is being accessed by a second instance of the application, different from the first instance. Transforming the component at a storage system containing the data may be performed independently of any accesses of the data. Transforming the component at a storage system containing the data may be performed by the storage system. The first instance of the application may run on a first host and the second instance of the application may run on a second host different from the first host. The first and second instances of the application may run on a same host.

20 Claims, 7 Drawing Sheets

TRANSFORMING APPLICATION-INSTANCE SPECIFIC DATA

TECHNICAL FIELD

This application relates to the field of computer systems and storage systems therefor and, more particularly, to the field of transforming data for storage systems.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units or logical devices. The logical devices may or may not correspond to any one of the actual disk drives. Allowing multiple host systems to access the single storage system allows the host systems to share data stored therein among different host processor systems.

It is important to provide replicas of data on storage systems to protect against data loss and data corruption and to be able to access prior versions of the data. A product offered by Dell EMC of Hopkinton, Mass., called zDP, provides continuous or near continuous versions of the data at different points in time by creating a series of targetless snapshots of different logical volumes of the storage system. The snapshots are deemed "targetless" because it is not necessary to define a target volume for a snapshot unless it is desirable to access the snapshot data. In most cases, when the data is not accessed, no target volume is defined and the snapshot data is eventually discarded as the snapshot data ages. However, in instances where it is desirable to access prior data, it is possible to define a volume for a prior snapshot and access the snapshot data by restoring the data on the storage system.

In some cases, replica data may not be used for processes on a host system without first being adapted (conditioned) to take into account differences in a new system. Application-instance specific data that varies according to a specific instance may need to be transformed prior to being accessed. For example, for the IBM Db2® Database application, an instance of the application may not be used to access data generated by a different instance until table objects have been modified to match object identifiers (OBIDs) between the instances. A recovery operation the runs a new instance of the IBM Db2® Database application may run a separate dedicated application on a host that reads elements of the application data for one instance and modifies each OBID to match the other instance. This may be time consuming and may use significant host resources, to the detriment of other running processes.

Accordingly, it is desirable provide a mechanism that handles application-instance specific data without requiring a dedicated conversion program to run on a host system.

SUMMARY OF THE INVENTION

According to the system described herein, transforming data that is provided by a first instance of an application that uses application-instance specific data includes determining if a component of the data is an application-instance specific component and, if the component is an application-instance specific component, transforming the component either at a storage system containing the data or as the component is being accessed by a second instance of the application, different from the first instance. Transforming the component at a storage system containing the data may be performed independently of any accesses of the data. Transforming the component at a storage system containing the data may be performed by the storage system. The first instance of the application may run on a first host and the second instance of the application may run on a second host different from the first host. The first instance of the application may access application data on the storage system and the second instance of the application may access application data on a different storage system. The first instance of the application may access application data on the storage system and the second instance of the application may access different application data on the storage system. The first instance of the application and the second instance of the application may run on a same host.

According further to the system described herein, a non-transitory computer readable medium contains software that transforms data that is provided by a first instance of an application that uses application-instance specific data. The software includes executable code that determines if a component of the data is an application-instance specific component and executable code that transforms the component either at a storage system containing the data or as the component is being accessed by a second instance of the application, different from the first instance, if the component is an application-instance specific component. Transforming the component at a storage system containing the data may be performed independently of any accesses of the data. Transforming the component at a storage system containing the data may be performed by the storage system. The first instance of the application may run on a first host and the second instance of the application may run on a second host different from the first host. The first instance of the application may access application data on the storage system and the second instance of the application may access application data on a different storage system. The first instance of the application may access application data on the storage system and the second instance of the application may access different application data on the storage system. The first instance of the application and the second instance of the application may run on a same host.

According further to the system described herein, a system that transforms data that is provided by a first instance of an application that uses application-instance specific data includes a first host that runs the first instance of the application and a first storage system coupled to the first host and having a processor that runs executable code that determines if a component of the data is an application-instance specific component and executable code that transforms the component either at the first storage system or as the component is being accessed by a second instance of the application, different from the first instance, if the component is an application-instance specific component.

Transforming the component at a storage system containing the data may be performed independently of any accesses of the data. The first instance of the application may run on a first host and the second instance of the application may run on a second host different from the first host. The first instance of the application may access application data on the first storage system and the second instance of the application may access application data on a second storage system different from the first storage system. The first instance of the application may access application data on the first storage system and the second instance of the application may access different application data on the first storage system. The first instance of the application and the second instance of the application may run on the first host.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein transforms application-instance specific data that would otherwise need to be transformed by a host application. The transformation may occur on-the-fly while data is being accessed or may be provided using a background process on a storage system that transforms data independently of the data being accessed.

Figure 1:
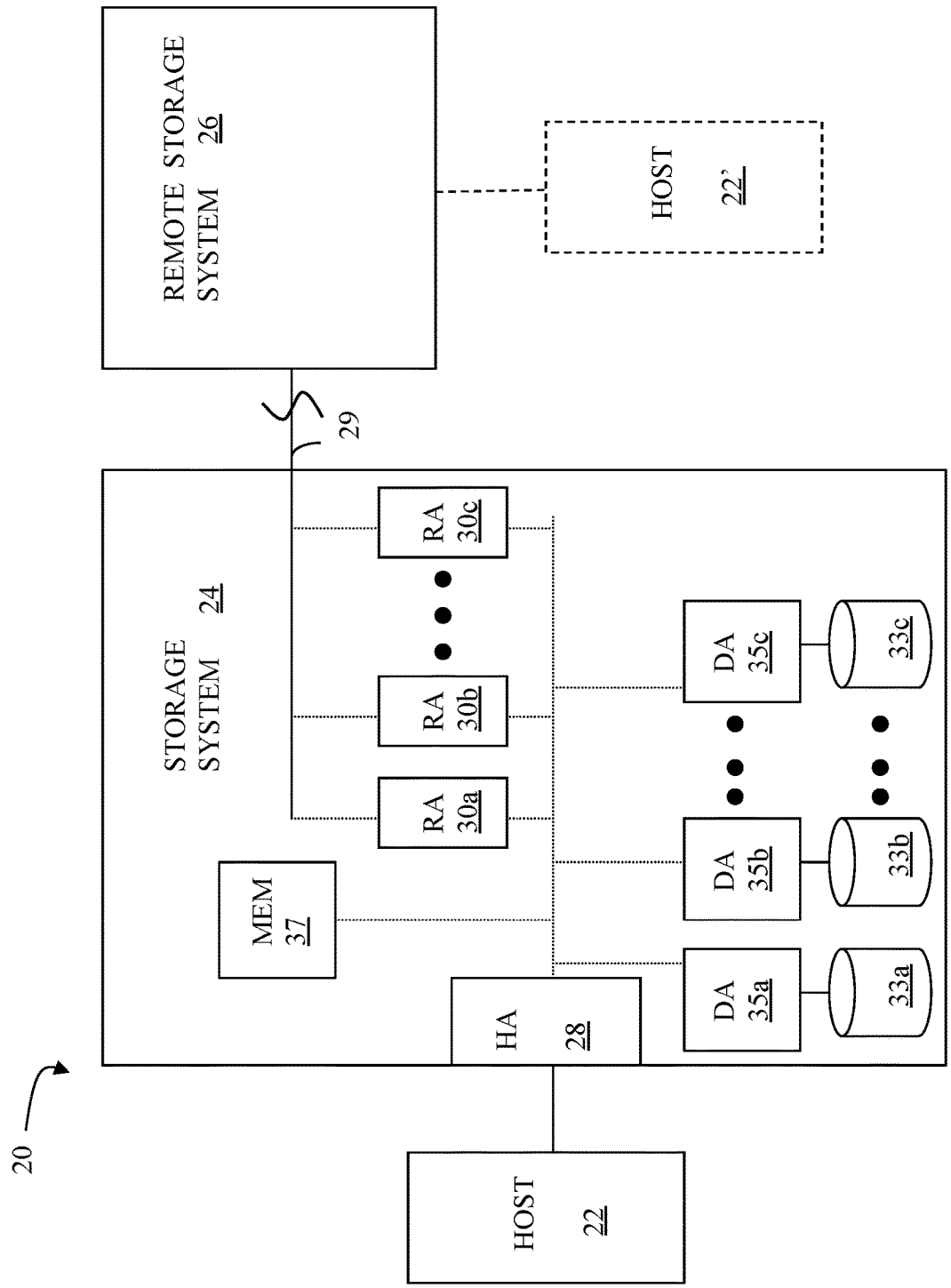
FIG. 1 is a schematic illustration showing a relationship between hosts and storage systems according to an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, another host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
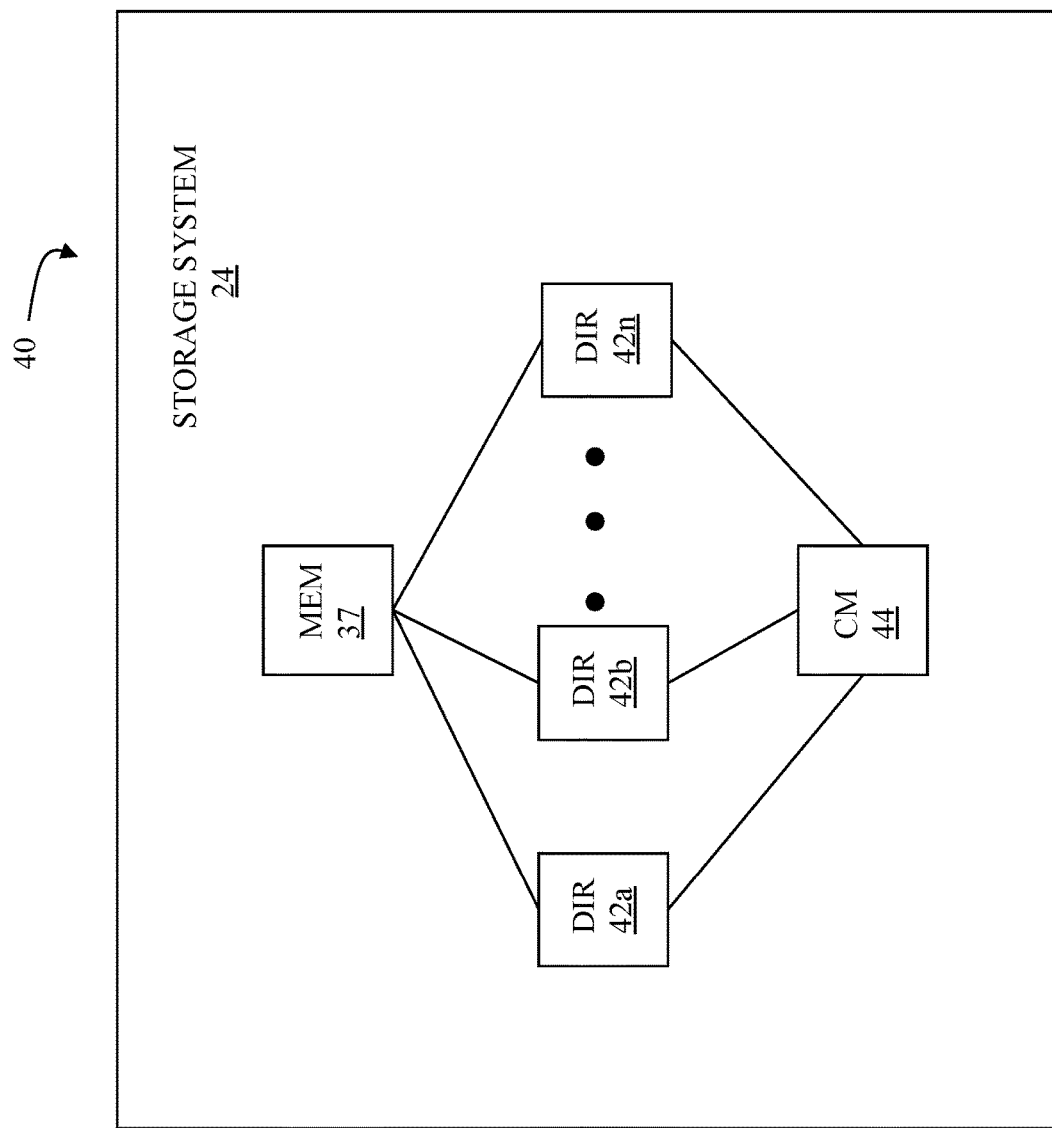
FIG. 2 is a schematic diagram illustrating an embodiment of a storage system where each of a plurality of directors are coupled to a memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
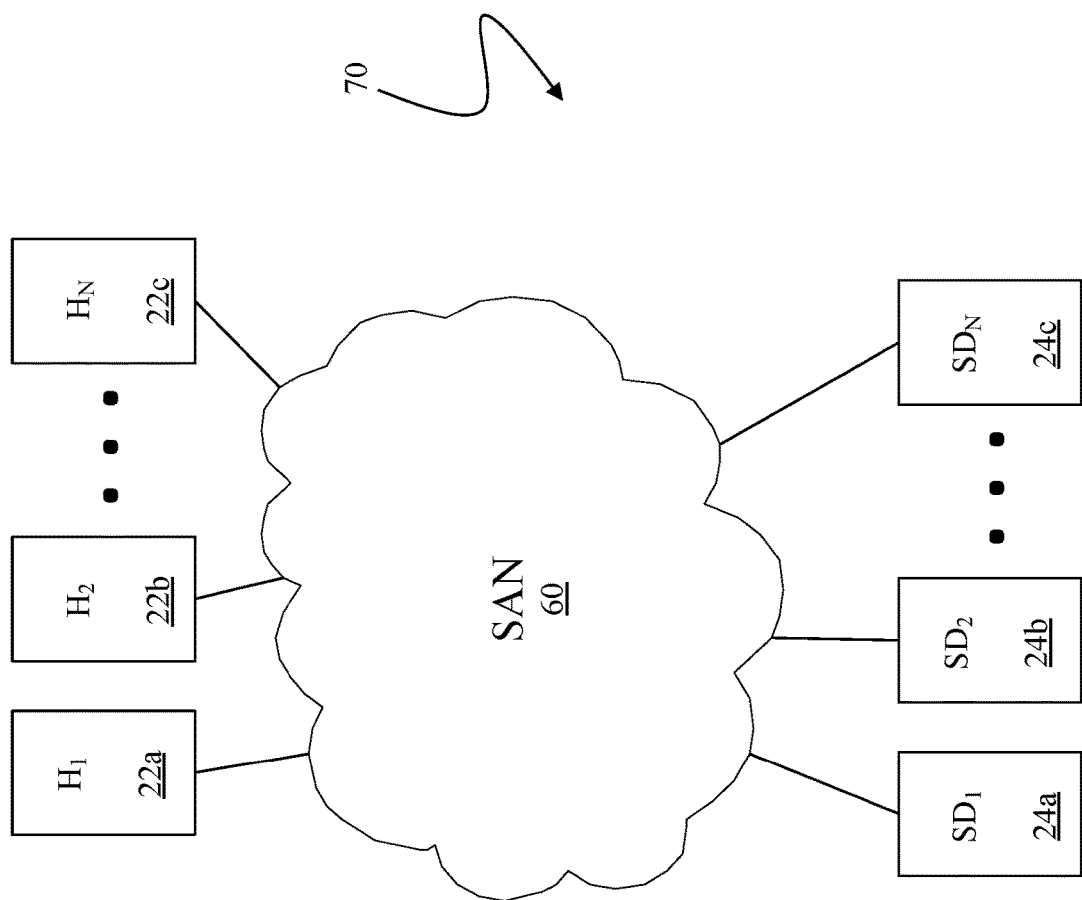
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among storage systems, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from Dell EMC.

Figure 4:
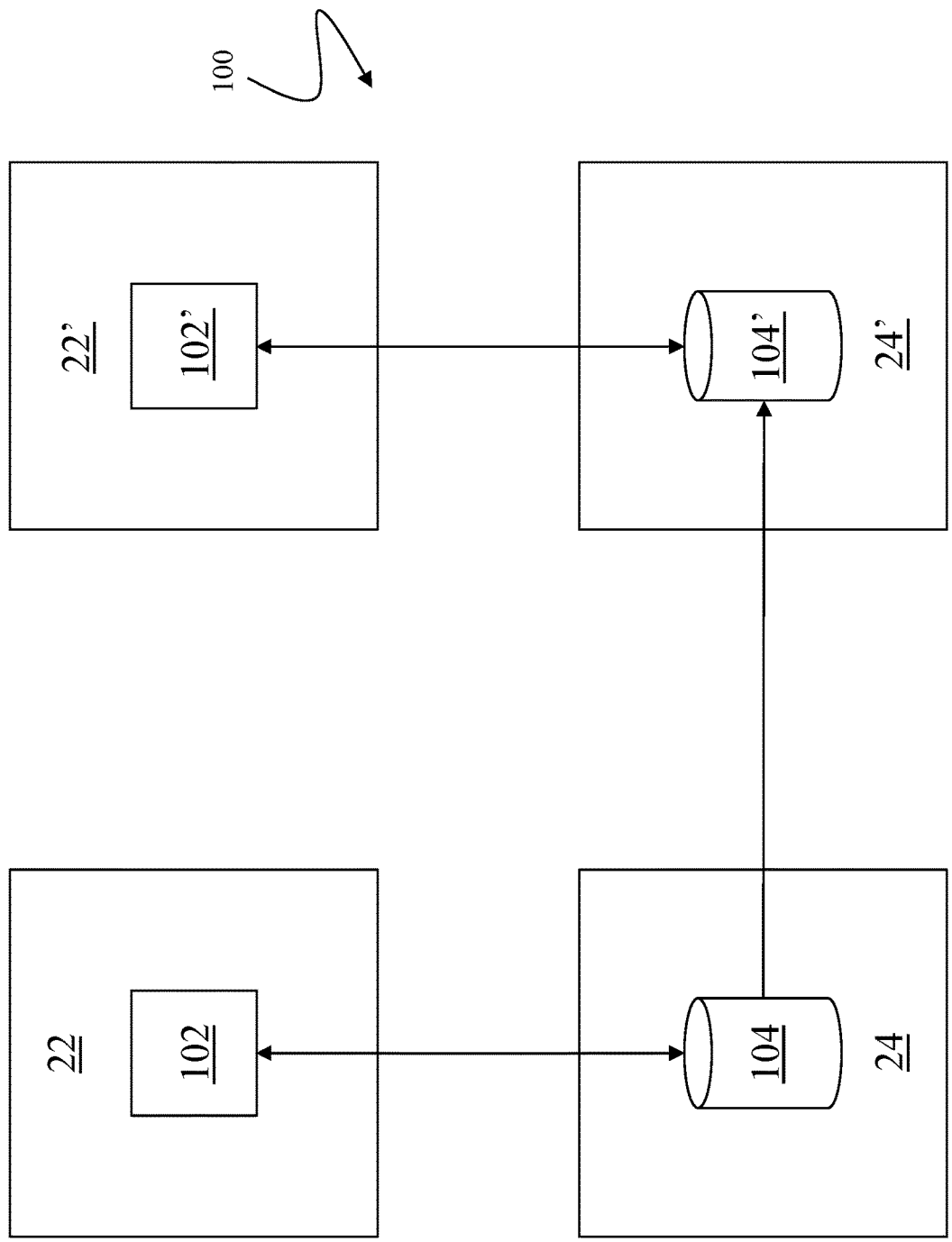
FIG. 4 is a schematic illustration showing a relationship between hosts with applications and storage systems with application data according to an embodiment of the system described herein.

Referring to FIG. 4, a diagram 100 shows the host 22 coupled to the local storage system 24 and the host 22' coupled to the remote storage system 26. The host 22 includes an application 102 that accesses application data 104 on the local storage system 24. The application data 104 may include application-instance specific data that varies according to a specific instance. For example, if the application 102 is the IBM Db2® Database application, then the application data may include database tables that have object ids (OBIDs) associated therewith where the OBIDs are associated with the specific instance of the application 102. A different instance of the application 102 running on the host 22 (or on another host) may use different OBIDs altogether and this may not be able to access the application data 104 without first transforming the OBIDs.

The diagram 100 also shows an application 102' running on the host 22'. The application 102' may be a different instance of the same application as the application 102 running on the host 22, discussed above. Thus, for example, the applications 102, 102' may both be the IBM Db2® Database application, but the application 102' is a different instance of the application running on a different host. The application data 104 may be replicated from the local storage system 24 to the remote storage system 26 to provide remote application data 104'. Replication may be synchronous or asynchronous. The application 102' accesses the remote application data 104'. In some embodiments, the application 102' may only be executed as part of a failover operation when the host 22 and/or the storage system 24 fails. In other embodiments, the application 102' may run on the host 22' while the application 102 runs on the host 22, in which case the application 102' may only read data while the application 102 is running concurrently.

In cases where the application data 104 includes application-instance specific data, the application data 104 may only be accessible/useable by the application 102 running on the host 22. Thus, if the application data 104' is an exact copy of the application data 104, the application data 104' may not be accessible by the application 102'. In such a case, the application data 104' may need to be transformed as the application data 104' is accessed by the application 102' or a data transformation may be provided following or in connection with replication between the storage systems 24, 26. This is described in more detail elsewhere herein.

Figure 5:
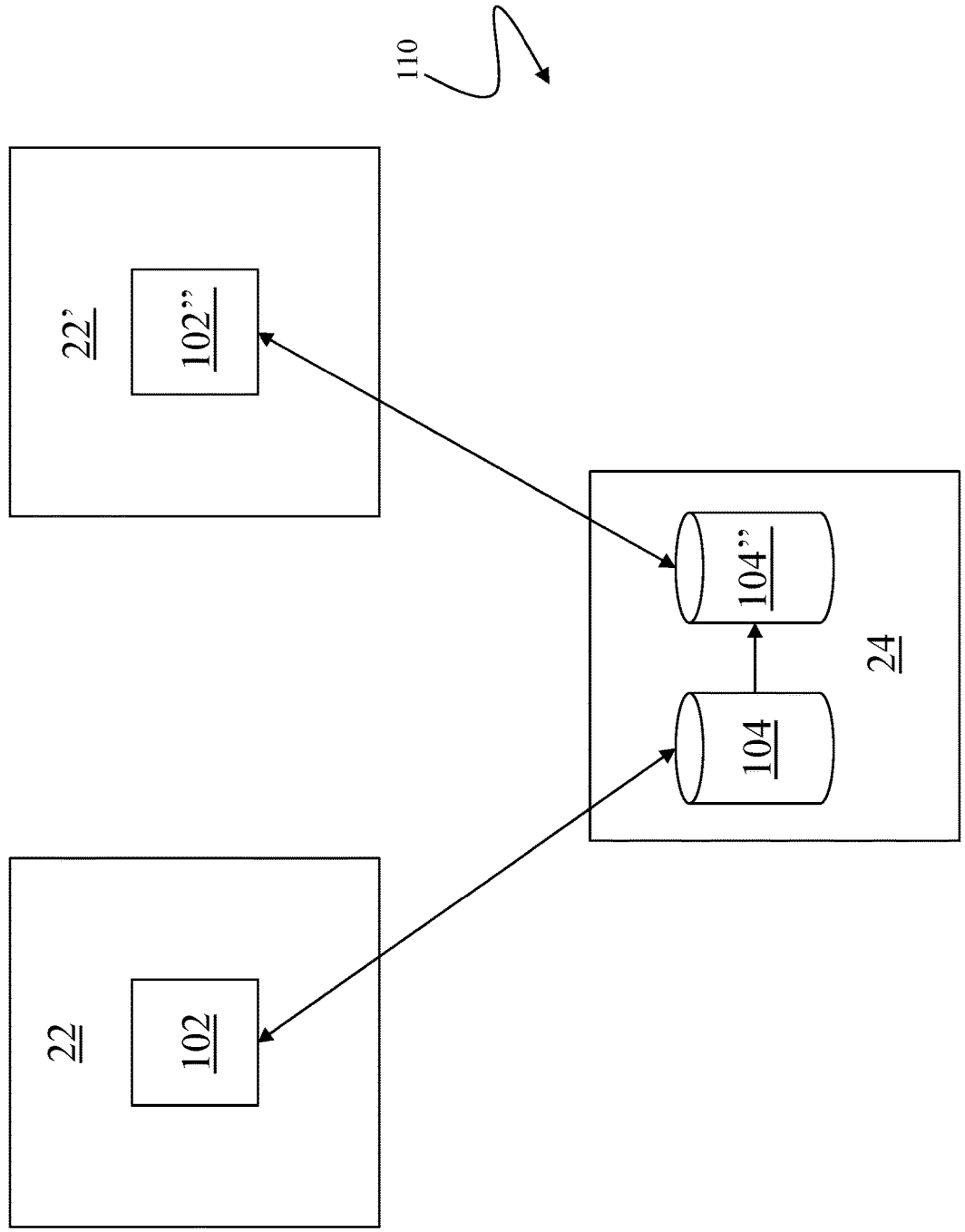
FIG. 5 is a schematic illustration showing a relationship between hosts with applications and a storage system with application data according to an embodiment of the system described herein.

Referring to FIG. 5, a diagram 110 shows a different embodiment where the host 22 is coupled to the local storage system 24 and a second local host 22" also coupled to the local storage system 24. The host 22 includes the application 102 that accesses the application data 104 on the local storage system 24. The second local host 22" includes an application 102" that accesses replicated application data 104" on the local storage system 24. The application 102" may be a different instance of the same application as the application 102 running on the host 22. The application data 104 may be replicated to provide the replicated application data 104", which may be application-instance specific data, described elsewhere herein. Any appropriate replication mechanism may be used, including snapshots, data duplication, etc. For example, replication may be provided using the zDP product from Dell EMC of Hopkinton, Mass. The application 102" accesses the replicated application data 104". In some embodiments, the application 102" may only be executed as part of a failover operation when the host 22 fails. In other embodiments, the application 102" may run on the host 22" while the application 102 runs on the host 22, in which case the application 102" may only read data from the replicated application data 104" while the application 102 is running concurrently.

In cases where the application data 104 includes application-instance specific data, the application data 104 may only be accessible/useable by the application 102 running on the host 22. Thus, if the replicated application data 104" is an exact copy of the application data 104, the replicated application data 104" may not be accessible/useable by the application 102". In such a case, the replicated application data 104" may need to be transformed as the replicated application data 104" is accessed by the application 102" or a data transformation may be provided following or in connection with replication of the application data 104. This is described in more detail elsewhere herein.

Figure 6B:
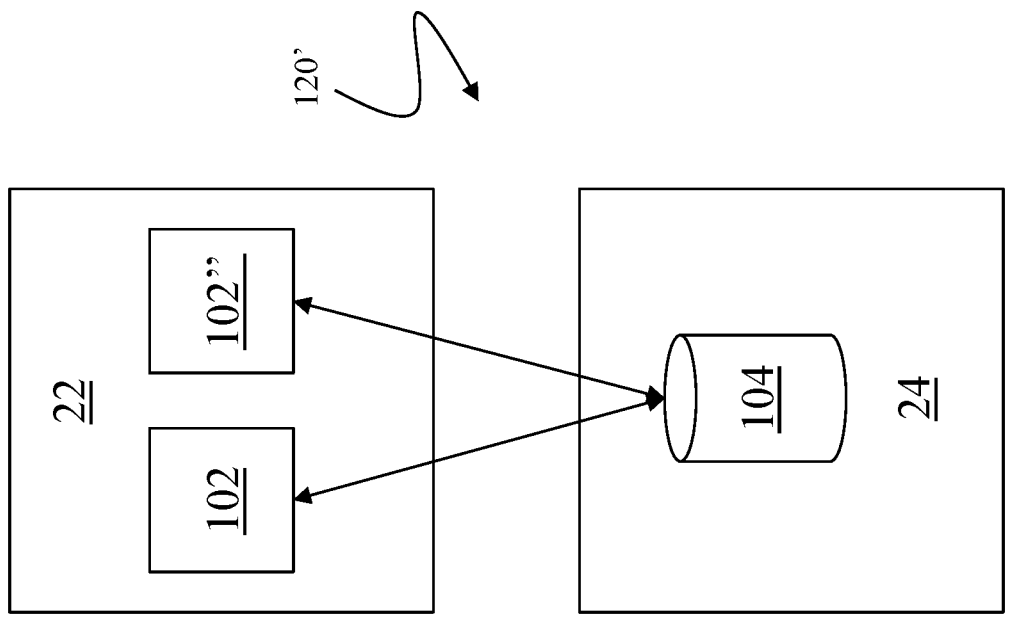
FIGS. 6A and 6B are schematic illustrations showing a relationship between a host with applications and a storage system with application data according to an embodiment of the system described herein.
Figure 6A:
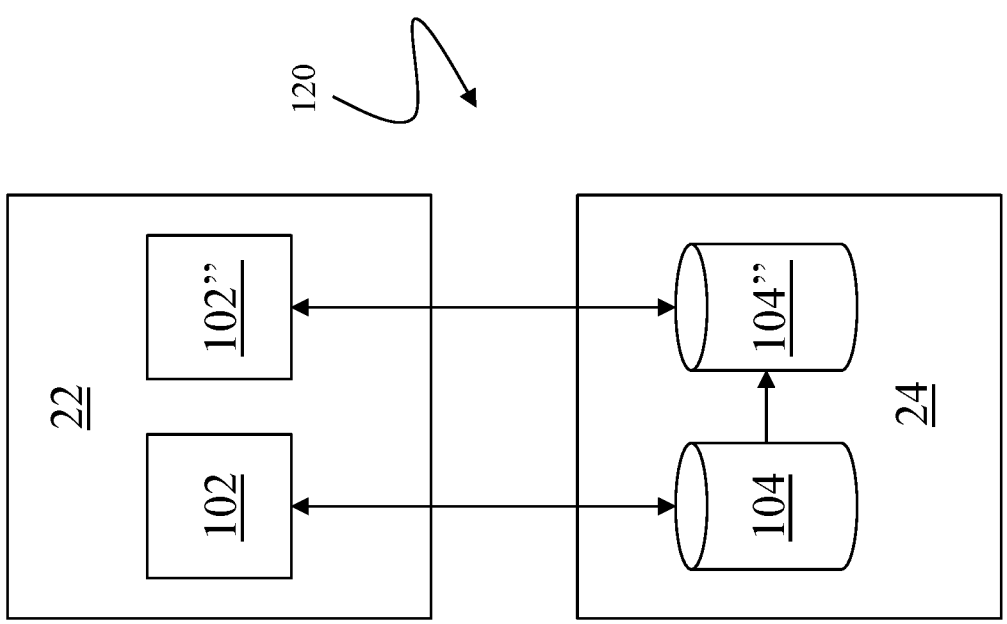

Referring to FIG. 6A, a diagram 120 shows a different embodiment where the host 22 is coupled to the local storage system 24 and includes the application 102 that accesses the application data 104 on the local storage system 24 and includes the application 102" that accesses the replicated application data 104" on the local storage system 24. The application 102" may be a different instance of the same application as the application 102, as described above in connection with FIG. 4. The application data 104 may be replicated to provide the replicated application data 104", which may be application-instance specific data, described elsewhere herein. Any appropriate replication mechanism may be used, including snapshots, data duplication, etc. For example, replication may be provided using the zDP product from Dell EMC of Hopkinton, Mass. The application 102" accesses the replicated application data 104". In some embodiments, the application 102" may only be executed as part of a failover operation when the application 102 fails. In other embodiments, the application 102" may run while the application 102 runs, in which case the application 102" may only read data from the replicated application data 104" while the application 102 is running concurrently.

In cases where the application data 104 includes application-instance specific data, the application data 104 may only be accessible/useable by the application 102. Thus, if the replicated application data 104" is an exact copy of the application data 104, the replicated application data 104" may not be accessible by the application 102". In such a case, the replicated application data 104" may need to be transformed as the replicated application data 104" is accessed by the application 102" or a data transformation may be provided following or in connection with replication of the application data 104. This is described in more detail elsewhere herein.

The embodiment illustrated by FIG. 6B is similar to the embodiment illustrated by FIG. 6B. A diagram 120' shows the host 22 is coupled to the local storage system 24 and includes the applications 102, 102". However, in the embodiment of FIG. 6B, both of the applications 102, 102" access the application data 104 on the local storage system 24. In some embodiments, the application 102" may only be executed as part of a failover operation when the application 102 fails. In other embodiments, the application 102" may run while the application 102 runs, in which case the application 102" may only read data from the application data 104 while the application 102 is running concurrently. In other cases, both of the applications 102, 102' may concurrent read and write data. In cases where the application data 104 includes application-instance specific data, the application data 104 may only be accessible/useable by the application 102. The application data 104 may need to be transformed as the application data 104 is accessed by the application 102" or a data transformation may be provided following or in connection with failover to the application 102". This is described in more detail elsewhere herein.

Figure 7:
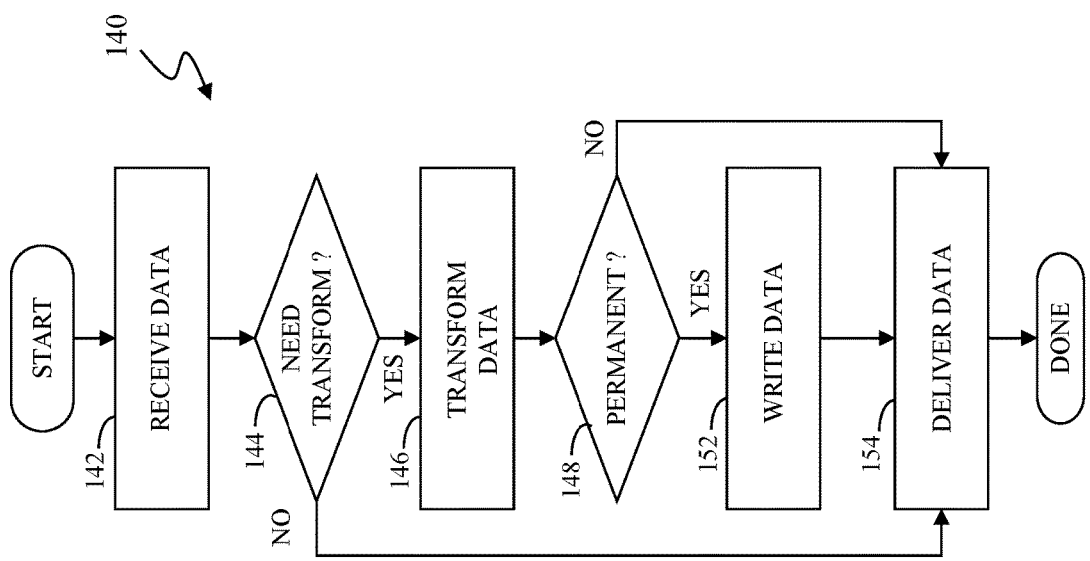
FIG. 7 is a flow diagram illustrating processing performed in connection with transforming application-instance specific data on-the-fly according to an embodiment of the system described herein.

Referring to FIG. 7, a flow diagram 140 illustrates processing performed in connection with reading either the remote application data 104' or the replicated application data 104" or, in some cases, the application data 104, in instances where the data being read is application-instance specific data. As discussed elsewhere herein, application-instance specific data may contain components that are adapted to operate with a specific instance of an application, such as specific OBIDs for a specific instance of IBM Db2® Database application. In some embodiments, the data may be transformed as the data is being read by an alternative instance of the application. For example, the application data 104 may be transferred to the remote application data 104' without any modification. Subsequently, when the data is accessed by the application 102' on the host 22', any application-instance specific components may be transformed as data is being read. In some cases, the transformation may be permanent. Also, in some instances the transformation may be performed by a host driver (e.g., a driver on the host 22') while in other cases, the transformation may be provided by the storage system. Note that providing the transformation at a storage system greatly reduces or eliminates extra work at the host to transform the data. One or more applications on the host read and write data in a conventional fashion and any transformation occurs at the storage system so that the host is presented with expected data with appropriate application-instance specific components.

Processing for the flow diagram 140 begins at a first step 142 where the data that is being accessed is received either by the host (if the host is performing the transformation) or at the storage system following a data fetch (if the storage system is performing the transformation). Following the step 142 is a test step 144 where it is determined if the data that was received at the step 142 needs to be transformed. Note that, even for a file or set of files containing application-instance specific data, not all of the data may necessarily need to be transformed. For example, if the application is the IBM Db2® Database application, then a transformation may only be needed for components of the data containing OBIDs for database tables. Other data components may not require any transformation at all.

If it is determined at the test step 144 that the data needs to be transformed, then control passes from the test step 144 to a step 146 where the transformation is provided. The specific transformation performed at the step 146 depends on the application and on the nature of the application-instance specific data. For example, if the application is the IBM Db2® Database application, then the transformation performed at the step 146 may be similar to operation of the Db2 command OBIDXLAT. Of course, other applications would be expected to have different operations that would be performed for transformation of application-instance specific data at the step 146.

Following the step 146 is a test step 148 where it is determined if the transformation is to be permanent. In some instances, it is desirable to maintain the transformation permanently in addition to being provided on-the-fly. Making the transformation permanent eliminates the need for subsequent transformations after a first access. If it is determined at the step 148 that the transformation is to be permanent, then control transfers from the step 148 to a step 152 where the transformation is written to the storage system. Following the step 152 is a step 154 where the data is delivered to the requesting application (e.g., the application 102', discussed elsewhere herein). Note that the step 154 is also reached from the test step 148 if the transformation is not being made permanent or from the test step 144 if no transformation is being performed at all. Following the step 154, processing is complete.

Figure 8:
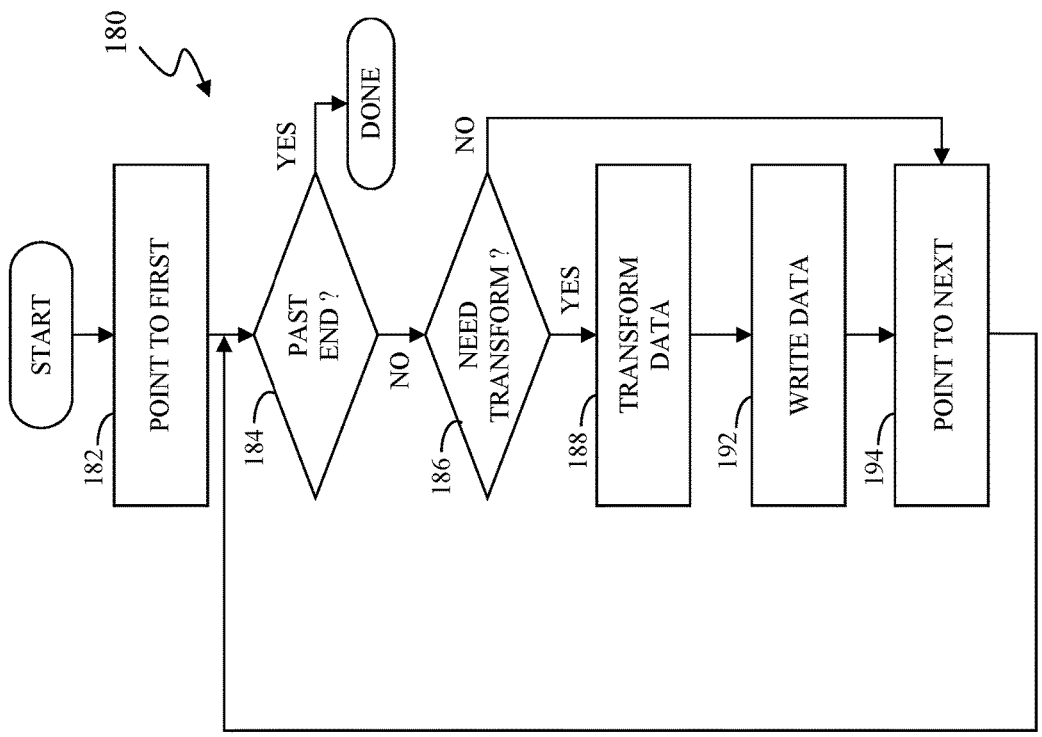
FIG. 8 is a flow diagram illustrating processing performed in connection with asynchronously transforming and storing application-instance specific data according to an embodiment of the system described herein.

Referring to FIG. 8, a flow diagram 180 illustrates processing performed in connection with asynchronously transforming and storing application-instance specific data. The processing illustrated by the flow diagram 180 may be independent of any accesses of data by a host. That is, the processing illustrated by the flow diagram 180 runs irrespective of whether any of the data on the storage system is accessed by any other process. Instead, the processing illustrated by the flow diagram 180 may be run as a background process until all of the application-instance specific data has been transformed. The processing illustrated by the flow diagram 180 may be performed in on the remote application data 104' or the replicated application data 104" or, in some cases, on the application data 104.

Processing begins at a first step 182 where an iteration pointer that iterates through all of the data (e.g., a block at a time or a track at a time) is initialized to point to a first portion of data. Following the step 182 is a test step 184 where it is determined if the iteration pointer points past the end of all of the data (i.e., whether all of the data has been processed). If so, then processing is complete. Otherwise, control transfers from the test step 184 to a test step 186 where it is determined if the data indicated by the pointer needs to be transformed. Just as with the test step 144, discussed above, even for a file or set of files containing application-instance specific data, not all of the data may necessarily need to be transformed.

If it is determined at the test step 186 that the data needs to be transformed, then control passes from the test step 186 to a step 188 where the transformation is provided. The specific transformation performed at the step 188 depends on the application and on the nature of the application-instance specific data. For example, if the application is the IBM Db2® Database application, then the transformation performed at the step 188 may be similar to operation of the Db2 command OBIDXLAT. Of course, other applications would be expected to have different operations that would be performed for transformation of application-instance specific data at the step 188. Following the step 188 is a step 192 where the transformation is written to the storage system. Following the step 192 is a step 194 where the iteration pointer is incremented. Following the step 194, control transfers back to the step 184, for another iteration.

In some embodiments, the processing illustrated by the flow diagram 180 may be performed on a replica of data following replication (e.g., following a snapshot). That is, following a snapshot, the processing illustrated by the flow diagram 180 may be initiated to modify the snapshot data. As another example, if data is replicated from a first storage system to a second storage system, the processing illustrated by the flow diagram 180 may then be initiated at the second storage system. Note also that the processing illustrated by either of the flow diagram 140, 180 may be performed on any data, including data that has not necessarily been replicated. Although the system has been described herein using examples from the IBM Db2® Database application, the system may be implemented for other applications that use application-instance specific data. Moreover, the system may be adapted to any instance where data needs to be transformed based on the context of applications and processing that access the data. For example, the system described herein may be adapted to make transformations based on security, such as when data needs to be re-encrypted with different keys or when data that is accessed by a system using a Microsoft Windows security domain is subsequently accessed by a different system using a different Microsoft Windows security domain.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of transforming data written to a first storage system, comprising:
   a first instance of an application writing a first set of object identifiers to the first storage system, wherein the first set of object identifiers are useable by the first instance of the application to access application data and unusable by a second instance of the application that is separate from the first instance of the application, wherein the first instance and the second instance are separate instances of the same application that use different object identifiers to access the same application data;
   replicating the first set of object identifiers to one of: the first storage system or a second storage system;
   detecting replication of the first set of object identifiers; and
   transforming the first set of object identifiers at a physical storage unit of the one of the storage systems containing the first set of object identifiers replicated thereto to a second set of object identifiers that are useable by the second instance of the application to access the application data in response to detecting replication of the first set of object identifiers.

2. The method, according to claim 1, wherein the first instance of the application runs on a first host and the second instance of the application runs on a second host different from the first host.

3. The method, according to claim 2, wherein the first instance of the application accesses the application data using the first set of object identifiers on the first storage system and the second instance of the application accesses the application data using the second set of object identifiers on the second storage system.

4. The method, according to claim 2, wherein the first instance of the application accesses the application data using the first set of object identifiers on the first storage system and the second instance of the application accesses the application data using the second set of object identifiers on the first storage system.

5. The method, according to claim 1, wherein the first instance of the application and the second instance of the application run on a same host.

6. The method, according to claim 1, wherein the application is a database application.

7. The method, according to claim 6, wherein the object identifiers correspond to tables of the database application.

8. A non-transitory computer readable medium containing software that transforms data written to a first storage system, the software comprising:
   executable code of a first instance of an application writing a first set of object identifiers to the storage system, wherein the first set of object identifiers are useable by the first instance of the application to access application data and unusable by a second instance of the application that is separate from the first instance of the application, wherein the first instance and the second instance are separate instances of the same application that use different object identifiers to access the same application data;
   executable code that replicates the first set of object identifiers to one of: the first storage system or a second storage system;
   executable code that detects replication of the first set of object identifiers; and
   executable code that transforms the first set of object identifiers at a physical storage unit of the one of the storage systems containing the first set of object identifiers replicated thereto to a second set of object identifiers that are useable by the second instance of the application to access the application data in response to detecting replication of the first set of object identifiers.

9. The non-transitory computer readable medium, according to claim 8, wherein the first instance of the application runs on a first host and the second instance of the application runs on a second host different from the first host.

10. The non-transitory computer readable medium, according to claim 9, wherein the first instance of the application accesses the application data using the first set of object identifiers on the first storage system and the second instance of the application accesses the application data using the second set of object identifiers on the second storage system.

11. The non-transitory computer readable medium, according to claim 9, wherein the first instance of the application accesses the application data using the first set of object identifiers on the first storage system and the second instance of the application accesses the application data using the second set of object identifiers on the first storage system.

12. The non-transitory computer readable medium, according to claim 8, wherein the first instance of the application and the second instance of the application run on a same host.

13. The non-transitory computer readable medium, according to claim 8, wherein the application is a database application.

14. The non-transitory computer readable medium, according to claim 13, wherein the object identifiers correspond to tables of the database application.

15. A storage system, comprising:
   a plurality of physical storage units that store data for the storage system; and
   a plurality of directors, each having at least one processor and a memory and having at least one of: disk adapters coupled to the physical storage units and a host adapter coupled to the disk adapter to exchange data therewith, wherein the host adapter couples the storage system to at least one host and wherein the memory includes executable code that, when executed by the at least one processor, detects a first set of object identifiers on one of the physical storage units that was written by a first instance of an application and replicated, the first set of object identifiers being useable by the first instance of the application to access application data and unusable by a second instance of the application that is separate from the first instance of the application, wherein the first instance and the second instance are separate instances of the same application that use different object identifiers to access the same application data, and wherein the memory also includes executable code that, when executed by the at least one processor, also transforms the first set of object identifiers at the storage system to a second set of object identifiers that are useable by the second instance of the application to access the application data in response to detecting replication of the first set of object identifiers.

16. The storage system, according to claim 15, wherein the first instance of the application runs on the at least one host and the second instance of the application runs on a different host.

17. The storage system, according to claim 16, wherein the first instance of the application accesses the application data using the first set of object identifiers on the storage system and the second instance of the application accesses the application data using the second set of object identifiers on the storage system.

18. The storage system, according to claim 15, wherein the first instance of the application and the second instance of the application run on the at least one host.

19. The storage system, according to claim 15, wherein the application is a database application.

20. The storage system, according to claim 19, wherein the object identifiers correspond to tables of the database application.

* * * * *